(12) United States Patent
Dickey et al.

(10) Patent No.: US 9,369,352 B1
(45) Date of Patent: Jun. 14, 2016

(54) METHOD OF CAPTURING SERVER AND OPERATING SYSTEM METRICS FOR VIRTUAL TO PHYSICAL TOPOLOGY REPORTING

(71) Applicant: Sprint Communications Company L.P., Overland Park, KS (US)

(72) Inventors: Kelby Dickey, Lenexa, KS (US); Kathleen M. Moffett, Belton, MO (US); Keith Trotter, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 127 days.

(21) Appl. No.: 14/453,927

(22) Filed: Aug. 7, 2014

(51) Int. Cl.
*G06F 15/173* (2006.01)
*H04L 12/24* (2006.01)
*H04L 12/26* (2006.01)

(52) U.S. Cl.
CPC ............ *H04L 41/5038* (2013.01); *H04L 43/08* (2013.01)

(58) Field of Classification Search
CPC .. H04L 41/5038; H04L 43/08; H04L 43/0823
USPC .......................................................... 709/224
See application file for complete search history.

(56) References Cited

U.S. PATENT DOCUMENTS

| 9,047,161 | B1 | 6/2015 | Burr et al. | |
| 9,176,974 | B1 | 11/2015 | Burr et al. | |
| 2005/0289072 | A1* | 12/2005 | Sabharwal | G06F 21/121 705/59 |
| 2006/0271677 | A1* | 11/2006 | Mercier | G06F 17/30197 709/224 |
| 2009/0119256 | A1* | 5/2009 | Waters | H04L 41/5064 |
| 2012/0311564 | A1* | 12/2012 | Khalid | G06F 8/61 718/1 |
| 2013/0246606 | A1* | 9/2013 | Branch | H04L 41/0853 709/224 |
| 2014/0137261 | A1* | 5/2014 | Chen | G06F 21/105 726/26 |

* cited by examiner

Primary Examiner — Tauqir Hussain

(57) ABSTRACT

A method of improving the accuracy of a topology report, the topology report covering a plurality of operating systems on a plurality of servers, the servers comprising virtual servers and physical servers, the servers comprising a plurality of processors or CPUs or both, each CPU comprising one or more cores, the method comprising, executing a first script on a computer to perform a primary analysis that accesses physical servers via an enterprise network to identify the physical servers, processors and cores, and a plurality of installed operating systems. The method further comprises automatically creating a topology report on a computer, wherein the topology report records the results of the primary analysis, executing a second script on a computer to perform one or more secondary analysis that collects information identifying a plurality of virtual software installed on the servers, and amending the topology report based on at least one secondary analysis.

19 Claims, 4 Drawing Sheets

METHOD OF CAPTURING SERVER AND OPERATING SYSTEM METRICS FOR VIRTUAL TO PHYSICAL TOPOLOGY REPORTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A service provider may obtain various operating systems ("OS") from third parties. These OSs may then be installed on the service provider's servers. Once the OSs are installed, applications based on those OSs may also be installed. The OSs may be installed on virtual servers or physical servers or both. Servers come in a range of shapes and structures, from large chassis with blades, to desktop and laptop computers running on CPUs (central processing units), the CPUs having one or more cores, or processors.

In most cases the third party OSs and applications are not free. That is, there may be an initial licensing fee, along with ongoing fee payments. The basis for the fees can sometimes be complex. For instance, the fee basis may look to how many servers, processors or cores (cores being processors on CPUs) the software is installed upon, or some combination thereof. Sometimes the costs are different depending on whether the OS is on a physical server or a virtual server, CPU v. blade, or other characteristics of the computing system. And when the service provider makes the license fee payments, they do not want to overpay, which costs them money needlessly, nor do they want to underpay, which may invoke penalties. Hence, there is a need to correctly and accurately track which servers, both physical and virtual, each specific OS and application are installed upon. In a situation where a service provider owns and uses a large number of servers, for example in the thousands, this determination turns out to be a challenge.

SUMMARY

In an embodiment, a method is disclosed of improving the accuracy of a topology report, the topology report covering a plurality of operating systems on a plurality of servers, the servers comprising virtual servers and physical servers, the servers comprising a plurality of processors or CPUs or both, each CPU comprising one or more cores, the method comprising executing a first computer script on a computer to perform a primary analysis that accesses a plurality of physical servers via an enterprise network to identify the physical servers, to identify a plurality of processors and cores in the physical servers, and to identify a plurality of operating systems installed on the physical servers, the processors, and the cores. The method also comprises automatically creating a topology report on a computer, wherein the topology report records the results of the primary analysis. The method also comprises executing a second computer script on a computer to perform one or more secondary analysis that collects information identifying a plurality of virtual software installed on the plurality of servers and amending the topology report based on at least one secondary analysis.

In another embodiment, a method is disclosed of improving the accuracy of a topology report, the topology report covering a plurality of operating systems on a plurality of servers, the servers comprising virtual servers and physical servers, the servers comprising a plurality of processors or CPUs or both, each CPU comprising one or more cores, the method comprising, executing a first computer script on a computer to create a topology report by performing a primary analysis attempting to identify all the physical servers, processors, CPUs and cores, and all the operating systems that are resident upon each of the servers, processors, CPUs, or cores, wherein the first script accesses the physical servers via an enterprise network. The method further comprises executing a second script on a computer to perform one or more secondary analyses collecting information regarding all of a plurality of virtual software installed on the plurality of servers, and amending the topology report based on the at least one secondary analysis, and, executing a third script on a computer to compare the results in the topology report regarding servers, processors, CPUs and cores against publicly available CPU core relationship information regarding at least one of the CPUs, and amending the topology report based on the publicly available CPU core relationship information.

In another embodiment, a method is disclosed of improving the accuracy of a topology report, the topology report covering a plurality of operating systems on a plurality of servers, the servers comprising virtual servers and physical servers, the servers comprising a plurality of processors or CPUs or both, each CPU comprising one or more cores, the method comprising, executing a first script on a computer to create a topology report by performing a primary analysis attempting to identify all the physical servers, processors, CPUs and cores, and all the operating systems that are resident upon each of the servers, processors, CPUs and cores, executing a second script on a computer to perform one or more secondary analyses collecting information regarding all of a plurality of virtual software installed on the plurality of servers, and amending the topology report based on the at least one secondary analysis, executing a third script on a computer to compare the results in the topology report regarding servers, processors and cores against publicly available CPU core relationship information regarding at least one of the CPUs, and amending the topology report based on the publicly available CPU core relationship information, and executing a fourth script on a computer to generate an exception report based on information in the topology report.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
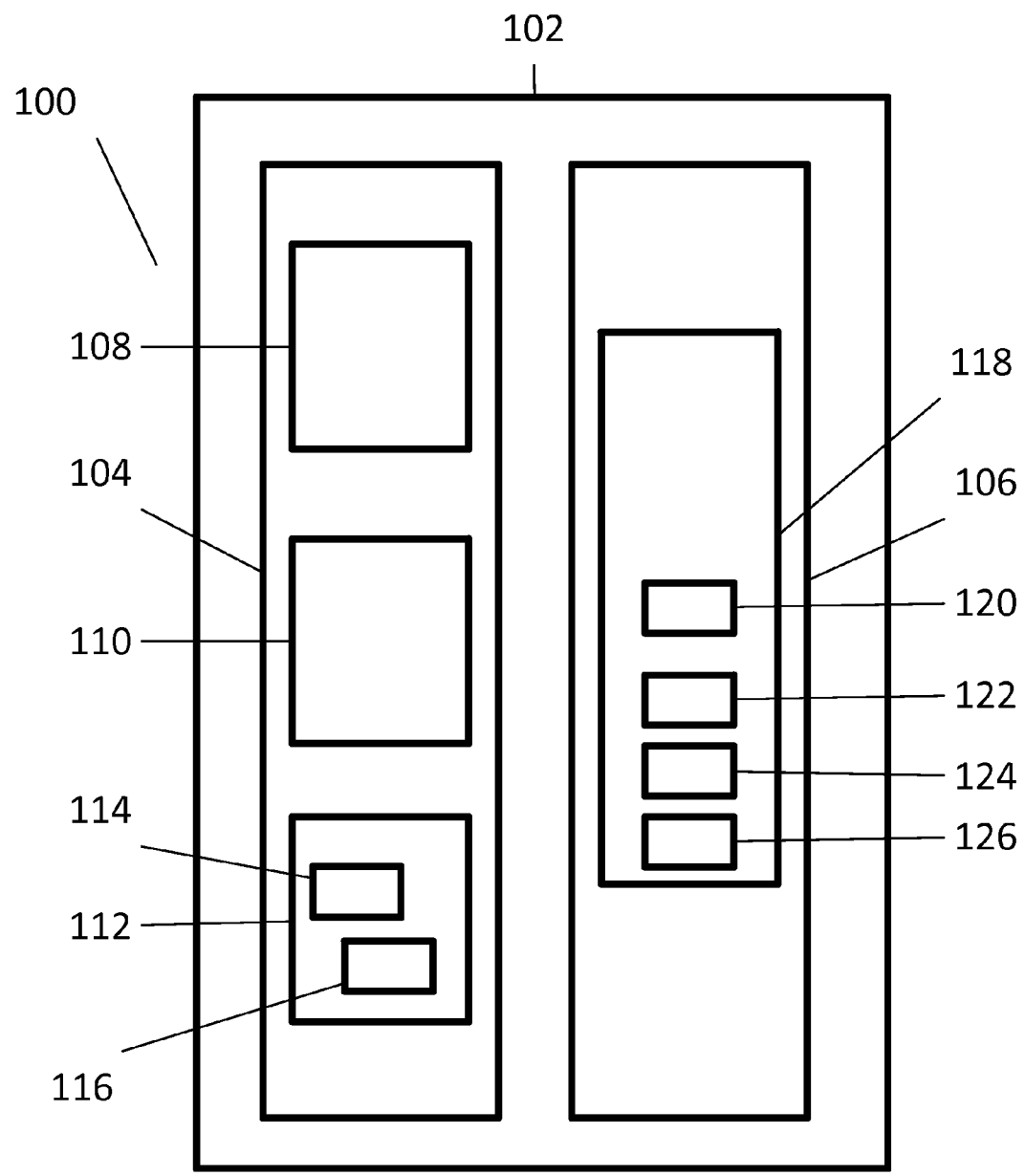
FIG. 1 is an illustration of an apparatus according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A service provider can obtain and install various third-party OSs on its servers, both physical and virtual. The exact location, and how many different servers, and sometimes processors, CPUs, or cores, on which the OS resides can affect the cost of the related licenses to the OSs. When there are a large number of servers, such as in the thousands, in a wide range of styles and other characteristics, correctly identifying all the various servers upon which the OSs and their applications reside can be very difficult. When there are thousands of virtual servers running on the physical servers, the challenge is made even more difficult. So for instance, ten thousand physical servers may have thirty thousand virtual servers, and a quarter million copies of various OSs and applications. Failure to accurately count all the necessary details, such as servers, CPUs and processors, may result in overpayment, which means money needlessly spent by the service provider, or underpayment, which may lead to penalties.

To address this challenge, a multi-directional approach is utilized. The first step is to create a topology report by doing a primary analysis of all the servers and all the OSs, to see how much information they can generate. This primary analysis will preferably be done by a single group with access to all the servers, such as an Asset Management Team, to generate the first iteration of the topology report. The Asset Management Team will preferably create a script to run to do this analysis, so that it can be repeated at any time automatically.

The topology report can include a variety of useful information. For example, with regard to each server, information could include: the location and identification of each virtual and physical server; which servers have parent/child relationships; how many processors are on each server; how many CPUs are on the server; how many cores are associated with each CPU; which OSs are on each server; how many processors each OS utilizes; and which version of each OS is on each server. The list of information may include many more items.

The topology report may also be able to be broken down into subreports. For instance, there could be subreports for base host information, host software information, and IP information. Each of these subreports could have various relevant content.

To improve the accuracy of the topology report, a second step may then be undertaken. A set of separate secondary analyses are made with regard to each virtual OS. Preferably the personnel responsible for each virtual OS are asked to ascertain all the servers upon which their particular program is located. These personnel may preferably also create scripts to run to perform the analyses, so that these secondary analyses may also be re-run at any time automatically. The information generated by the secondary analyses is merged into the topology report, to improve the accuracy of the topology report.

A third step that can be undertaken is to then compare the results on the topology report, especially regarding the number of processors and servers, against public domain information regarding the hardware, known as CPU core relationship information. This public domain analysis may yield additional useful information, indicating where the first two reports may have been misled by creative aspects of the hardware, and thereby again improve the accuracy of the topology report. Again, a script will be prepared that can be run at any time to perform this analysis automatically.

And finally a fourth step that can be undertaken is to generate an exception report, to assist an Asset Management team in understanding where there are needs of looking at specific servers in more specific detail to ensure the accuracy of the topology report. Again, a script will be prepared that can be run at any time to generate this report automatically.

The fully amended topology report is then used to assist in determining how much should be paid to cover the licenses for all the various third-party OSs. Thereby, the service provider can ensure that they are not overpaying or underpaying for software. Said in other words, the finished topology report may be used to settle license fee payments and to substantiate the bases for license fee payments.

The topology report may be periodically updated. The updating is accomplished by re-running the various automatic analyses. That would include the primary analysis, the secondary analyses, and the public domain analysis. Each of these analyses could be re-run based on different periods of time. For instance, some could be re-run once a day, and some could be re-run once a week. It may also be preferable to rerun the entire set of analyses at some certain instances of time.

Referring now to FIG. 1, a schematic diagram of a system 100 is shown. A modern telecommunication service provider may require thousands of physical servers. For purposes of illustration of the challenges, a chassis 102 is shown that contains two physical servers 104 and 106. While shown here as a single chassis and only two physical servers, in fact a system may include any number of chassis, with each chassis having any number of servers. Server 104 has three physical processors 108, 110, and 112. Physical processor 112 includes two virtual servers 114 and 116. Physical servers 108 and 110 do not have any virtual servers laid over them. The relationship between the physical server and a virtual server residing on the physical server is called "parent/child". That is, the virtual server is a "child" of the "parent" physical server. Typically the parent knows all its children, but a child may not know who its parent is. This can be an issue when attempting to ascertain the physical location of various OS or applications. Also, a physical server may be only partially overlaid by one or more virtual processors.

Server 106 has a single CPU 118, which in turn has four cores 120, 122, 124 and 126. A CPU will typically have a number of "cores", each core being a processor. However, in general these cores act in concert to address a single task, and work as one large processor. This becomes important when trying to count how many "processors" upon which an OS resides.

The licenses for the OSs may have various bases for periodic license fees. For instance, these fees may have to be paid monthly, quarterly, semi-annually, or annually. The license fee may be based on how many servers an OS is installed upon. Or the basis may be how many processors. So looking at FIG. 1, if a particular OS is installed on virtual server 116, is it also on physical processor 112 for licensing fee purposes? Is it also on physical server 104? And looking at physical server 106, if the license fee is based at least partially on processors, and the OS is installed on CPU 118, the OS will run on all the cores 120-126, yet the CPU is really acting as just one large processor. How is this situation handled in the OS license? As is apparent, the amount owed for license fees will be very dependent on the exact language of the license, how accurately all the various relationships can be ascertained, and how these various potential conflicts are dealt with in the license. Simply generating a report that asks "How many servers and processors is the OS installed upon" will not yield an accurate answer. As is seen from these examples, clearly understanding the topology of the complete system as best as possible is useful in understanding how much in license fee payments are to be made. Note that while the bulk of the discussion herein is in regard to OSs, there may also be a need to capture relevant information about applications that run on the OSs, as they may also have their own licenses fees. A similar topology report could be generated for the applications.

Figure 2:
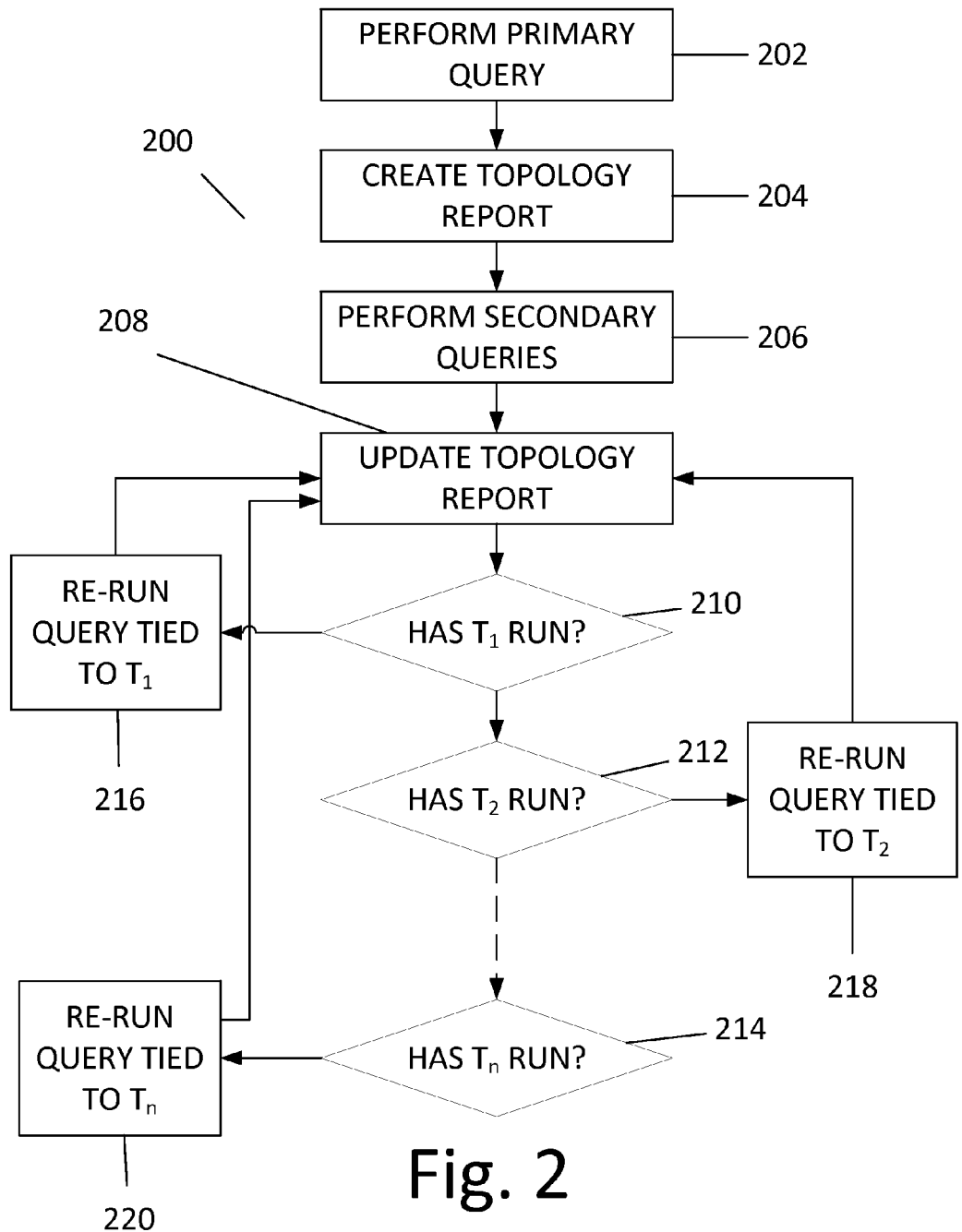
FIG. 2 is a flowchart illustrating a method according to an embodiment of the disclosure.

Referring now to FIG. 2, a schematic diagram of a method 200 is shown. The method 200 is for the creation and updating of a topology report. Initially a primary analysis is undertaken 202. The analysis will preferably be performed by a single group within the service provider, such as an Asset Management Team. The analysis will preferably be performed by a script that has been created by the Asset Management Team. By using a script, the analysis can be re-run at any time automatically. The analysis may seek out identification information for all the servers in the system, both physical and virtual, as best it can. For example, the script may automatically remotely log into each of a plurality of physical servers on an enterprise network and execute remote commands on the servers to enumerate installed and configured resources on those servers. The analysis will also seek to ascertain where all the OSs are located, which servers they reside on, either physical, virtual, or both, as well as gather additional information about the OS copies on the various servers, such as which version of the OS it is, and when was it last updated. Likewise, information related to the number of processors per server, and the number of CPUs and the number of cores per CPU will also be ascertained.

The next step is to generate 204 the topology report. The report can be presented in multiple different forms. For instance, there may be a base form report to report base form information. This sub-report could primarily document details for each server. There may also be a host software information report, which primarily documents details of each occurrence of an OS. There may also be an IP information report, documenting specifics of all the various IP addresses in the system. Other reports may be generated documenting other details in more specificity. In one embodiment, the report would comprise a group of records wherein each record is specific to a single server, and each record further comprising a list of relevant additional information about the server, including such information as server ID, server vendor, server model, size of server memory, is the server virtual or physical, does it have a parent, what type and how many CPUs are on the server, total cores, which OS are on the server, which vendor and release of the OSs, and other information related to the specific server. The report may preferably be stored in an ELT (extract, translate and load) server.

After the topology report is created, a series of secondary analyses are undertaken 206 automatically. There may be a separate secondary analysis for each different virtual OS. Such virtual OS may include VMWare, LPAR, LDOM, SUN-containers, and numerous others. These secondary analyses are undertaken as the primary analysis may not be able to clearly discern exactly how many copies of various OSs are on the various servers, and the true relationship between virtual and physical servers for the complete system 200. That is, the secondary analyses may allow more accurate mapping of virtual servers to physical servers. These secondary analyses may preferably be run by automated scripts that have been created by the personnel tasked with management of the various virtual OSs, as they may be better able to correctly identify exactly which virtual servers the OS is located on, and which physical servers house each of the virtual servers. The secondary analyses may use software provided by the relevant vendor, or they may use software created by the internal OS team.

As each secondary analysis is completed, its results are added 208 to the topology report, to update it with more accurate information. If there are conflicts in the results of the various analyses, a person may preferably look at any conflicting information to decide which information they consider more reliable. After the amended topology report is completed, the enterprise may pay license fees to vendors of operating systems in accordance with the amended topology report.

Once the amended topology report is completed, it may then be updated periodically thereafter, to allow for servers, CPUs, processors and software being added and dropped. There may be more than one basis for determining when to run a particular analysis again. For example, each analysis may have a set maximum wait time. That is, a set maximum time between runs of the analysis. If that maximum wait time is reached without the analysis being run, it will be run at that time. The set maximum wait time for each analysis may be the same, or some may be different. It may sometimes be preferable to run all the updates at once. For example, if certain OS vendors want a report generated every Friday, to help determine total usage through a quarter, one could run all the analyses on that Friday. So, some or all of the analyses could be re-run based on more than one time schedule. Note that while the bulk of the discussion herein is in regard to OSs, there may also be a need to capture relevant information about applications that run on the OSs, as they may also have their own license fees.

Referring again to FIG. 2, after the updated topology report is generated 208, different times ($T_1, T_2, \ldots T_n$) are watched for 210, 212 and 214. There may be enough T's to match up to all the various analyses, as well as a specific time tied to doing all of them at once. When one of these times is reached, then a specific analysis or set of analyses are re-run, and the results fed back (216, 218, 220 respectively) into the topology report. For example, when the time $T_1$ has run, the primary analysis may be re-run. When the time $T_2$ has run, the secondary analysis related to VMWare may be re-run. Using this methodology, the topology report is thereby updated periodically.

Figure 3:
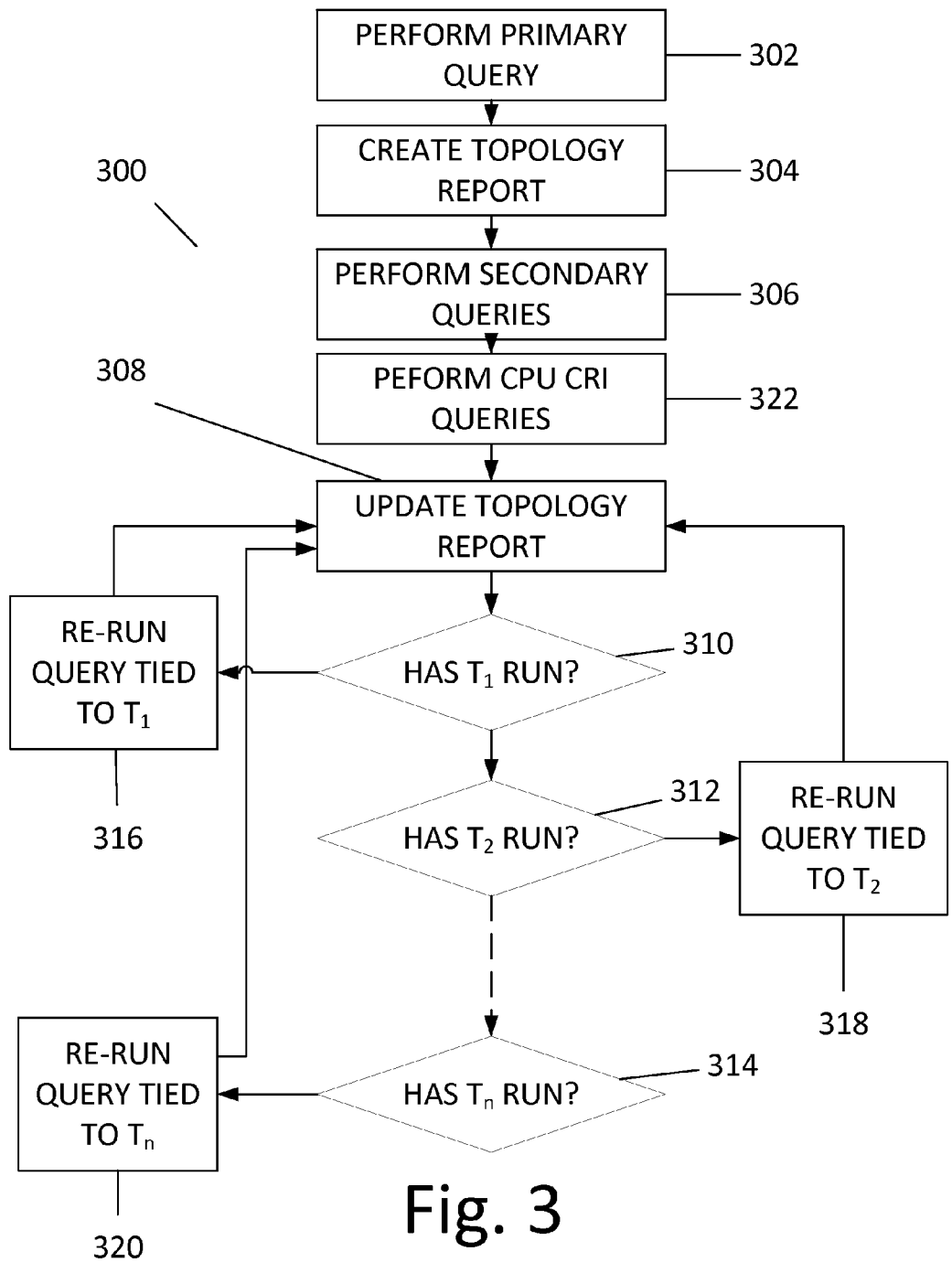
FIG. 3 is a flowchart illustrating a method according to an embodiment of the disclosure.

Referring now to FIG. 3, a schematic diagram of a method 300 is shown. This method is similar to that in FIG. 2, but adds additional steps. As before, initially a primary analysis is undertaken 302. The analysis will preferably be performed by a script that has been created by the Asset Management Team. By using a script, the analysis can be re-run at any time automatically. The analysis may seek out identification information for all the servers in the system, both physical and virtual, as best it can. The analysis will also seek to ascertain where all the OSs are located, which servers they reside on, either physical, virtual, or both, as well as gather additional information about the OS copies on the various servers, such as which version of the OS it is, and when was it last updated.

Likewise, information related to the number of processors per server, and the number of CPUs and the number of cores per CPU will also be ascertained.

The next step is to generate 304 the topology report. The report can be presented in multiple different forms. For instance, there may be a base form report, primarily documenting base form information details for each server. There may also be a host software information report, which primarily documents details of each occurrence of an OS. There may also be an IP information report, documenting specifics of all the various IP addresses in the system. Other reports may be generated documenting other details in more specificity. In one embodiment, the report would comprise a group of records wherein each record is specific to a single server, and each record further comprising a list of relevant additional information about the server, including such information as server ID, server vendor, server model, size of server memory, is the server virtual or physical, does it have a parent, what type and how many CPUs are on the server, total cores, which OS are on the server, which vendor and release of the OSs, and other information related to the specific server. The report may preferably be stored in an ELT (extract, translate and load) server.

After the topology report is created, it is now ready for regular updating and correction. To that end, a series of secondary analyses are undertaken 306 automatically. There may be a separate secondary analysis for each different virtual OS. Such virtual OS may include VMWare, LPAR, LDOM, SUNcontainers, and numerous others. These secondary analyses are undertaken as the primary analysis may not be able to clearly discern exactly how many copies of various OS are on the various servers, and the true relationship between virtual and physical servers for the complete system 300. That is, the secondary analyses may allow more accurate mapping of virtual servers to physical servers. The results of these secondary analyses are preferably generated by automated scripts written by the personnel tasked with management of the various virtual OSs, as they may be better able to correctly identify exactly which virtual servers the OS is located on, and which physical servers house each of the virtual servers. The secondary analyses may use software provided by the relevant vendor, or they may use software created by the internal OS team.

As each secondary analysis is completed, its results are added 308 to the topology report, to update it with more accurate information. It may be that if there is a conflict in the information provided by the various analyses, a person may preferably look at any conflicting information to decide which information they consider more reliable.

Once the amended topology report is completed, it may then be updated periodically thereafter. There may be more than one basis for determining when to run a particular analysis again. For example, each analysis may have a set maximum wait time. That is, a set maximum time between runs of the analysis. If that maximum wait time is reached without the analysis being run, it will be run at that time. The set maximum wait time for each analysis may be the same, or some may be different. It may sometimes be preferable to run all the updates at once. For example, if certain OS vendors want a report generated every Friday, to help determine total usage through a quarter, one could run all the analyses on that Friday. So, some or all of the analyses could be re-run based on more than one time schedule. Note that while the bulk of the discussion herein is in regard to OSs, there may also be a need to capture relevant information about applications that run on the OSs, as they may also have their own licenses fees.

Referring again to FIG. 3, after the updated topology report is generated 308, different times ($T_1, T_2, \ldots T_n$) are watched for 310, 312 and 314. There may be enough T's to match up to all the various analyses, as well as a specific time tied to doing all of them at once. When one of these times is reached, then a specific analysis or set of analyses are re-run, and the results fed back (316, 318, 320 respectively) into the topology report. For example, when the time $T_1$ has run, the primary analysis may be re-run. When the time $T_2$ has run, the secondary analysis related to VMWare may be re-run. Using this methodology, the topology report is thereby updated periodically.

An additional step that can be included has to do with some of the challenges of accurately determining how many processors, CPUs and cores are on a server. Some processors or CPUs are set up to create the illusion of being multiples of themselves. For example, some CPUs when queried will say that they have four processors and sixteen cores, when in fact it is a single processor with four cores. A situation where this may occur is hyperthreading.

To deal with this challenge, a public domain analysis may be periodically added 322 into the mix. The public domain analysis includes pulling a collection of publicly available information about how various CPUs report themselves, known as CPU core relationship information. One example of this type of information is finding out which CPUs use hyperthreading. This information can come from various sources, including white papers published by the vendors of the CPUs, advertisements, etc. The public domain information is preferably collected up into a server and updated as additional relevant CPU core relationship information becomes known to the keeper of the public domain server. As with the other analyses, these results are added into the topology report to create a more accurate report. Also as with the other analyses, various time frames ($T_1, T_2 \ldots T_n$) may be used as the basis for updating this analysis into the topology report. For instance, there may be a first set period under which an update of the public domain analysis is sent to the topology report. There may also be set times when all the analyses, including the public domain analysis, are updated at generally the same time, such as a set day or date. Given how sporadically additional relevant public domain information may come in, with regard to this analysis it may be preferable to send in an updated public domain analysis every time any new information is added to the public domain information on the public domain server, and perhaps only when new information is added.

A collateral benefit of the topology reporting process is that the Asset Management Team may thereby become aware of incongruous results, making the Team unsure of which information is correct. So one additional report that could come out of the topology report is an exception report. The exception report would highlight where conflicting information is occurring and where it is not readily apparent which piece of the conflicting information is correct. By generating the exception report, the Asset Management Team may spend their time and energy looking at just the specific problems they need to address, and once the correct answer is ascertained, they may implement into the analyses a method to make sure the correct information is always reported thereafter. Again, this feedback into the process allows the topology report to continue to be constantly improved and made more accurate. Note that while the bulk of the discussion herein is in regard to OSs, there may also be a need to capture relevant information about applications that run on the OSs, as they may also have their own licenses fees.

Figure 4:
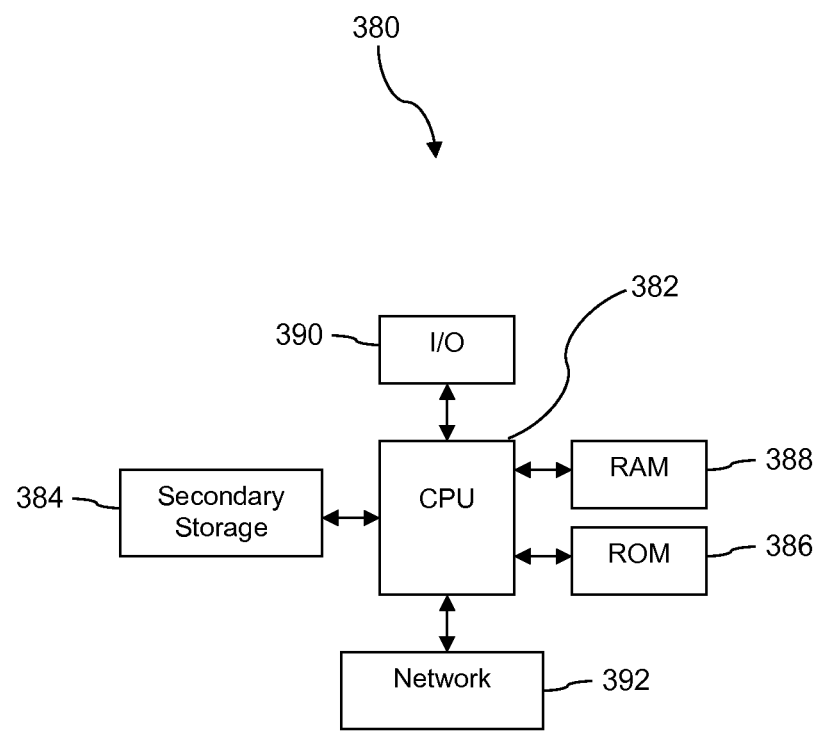
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of improving the accuracy of a topology report, the topology report covering a plurality of operating systems on a plurality of servers, the servers comprising virtual servers and physical servers, the servers comprising a plurality of processors or CPUs or both, each CPU comprising one or more cores, the method comprising:

executing a first script on a computer to create a primary topology report by performing a primary analysis that accesses a plurality of physical servers via an enterprise network to identify the physical servers, to identify a plurality of processors, CPUs and cores in the physical servers, and to identify a plurality of operating systems installed on the physical servers, the processors, CPUs and the cores;

executing a second script on the computer to perform one or more secondary analysis that collects information identifying a plurality of virtual software installed on the plurality of servers, and amending the primary topology report based on at least one of the one or more secondary analysis to create a secondary amended topology report;

executing a third script on the computer to compare the results in the secondary amended topology report regarding servers, processors and cores against publicly available CPU core relationship information regarding at least one of the CPUs, and amending the secondary amended topology report based on the publicly available CPU core relationship information to create an updated secondary amended topology report; and paying license fees to vendors of operating systems in accordance with the updated secondary amended topology report.

2. The method of claim 1, wherein the results of the primary analysis and the one or more secondary analyses are stored on an extract, translate and load server.

3. The method of claim 1, wherein the primary analysis and the one or more of the secondary analyses are re-run periodically, the primary topology report being amended based on the updated analyses.

4. The method of claim 3, wherein the primary analysis has a first time period for re-running, and the one or more secondary analyses have a second time period for re-running, the first time period and the second time period being different.

5. The method of claim 1, wherein the primary analysis attempts to locate each of the operating systems as residing on at least one of either one of the virtual servers or one of the physical servers or both.

6. The method of claim 5, wherein the one or more secondary analysis attempts to locate each of the plurality of operating systems as residing on at least one of either one of the virtual servers or one of the physical servers or both.

7. A method of improving the accuracy of a topology report, the topology report covering a plurality of operating systems on a plurality of servers, the servers comprising virtual servers and physical servers, the servers comprising a plurality of processors or CPUs or both, each CPU comprising one or more cores, the method comprising:

executing a first script on a computer to create a primary topology report by performing a primary analysis to identify the physical servers, processors, CPUs and cores, and the operating systems that are resident upon each of the servers, processors, CPUs and cores, wherein the first script accesses the physical servers via an enterprise network;

executing a second script on the computer to perform one or more secondary analyses collecting information regarding all of a plurality of virtual software installed on the plurality of servers, and amending the primary topology report based on the at least one secondary analysis to create a secondary amended topology report; and executing a third script on the computer to compare the results in the secondary amended topology report regarding servers, processors and cores against publicly available CPU core relationship information regarding at least one of the CPUs, and amending the secondary amended topology report based on the publicly available CPU core relationship information to create an updated secondary amended topology report, wherein payment of royalties for the operating systems is made based at least partially on the updated secondary amended topology report.

8. The method of claim 7, wherein the CPU core relationship information is related to hyperthreading.

9. The method of claim 7, wherein the updated secondary amended topology report comprises at least a base host information report, a host software information report, and an IP information report.

10. The method of claim 9, wherein the base host information report comprises a plurality of records, each record corresponding to one server, wherein each record comprises the identity of the server, where the server is located, whether it is virtual or physical, any relationship between the server or other virtual and physical servers, which operating systems reside on the server, which version of each operating system resides on the server, total cores on the server, and total processors on the server.

11. The method of claim 9, wherein the host software report comprises a plurality of records, each record corresponding to one location of one piece of software, and wherein each record comprises server identification, the identity of the software, the version number of the software, whether the server is virtual or physical, and the total number of CPUs and cores on the server.

12. The method of claim 9, wherein the IP report comprises IP addresses for each server.

13. A method of improving the accuracy of a topology report, the topology report covering a plurality of operating systems on a plurality of servers, the servers comprising virtual servers and physical servers, the servers comprising a plurality of processors or CPUs or both, each CPU comprising one or more cores, the method comprising:

executing a first script on a computer to create a primary topology report by performing a primary analysis attempting to identify all the physical servers, processors, CPUs and cores, and all the operating systems that are resident upon each of the servers, processors, CPUs and cores;

executing a second script on the computer to perform one or more secondary analyses collecting information regarding all of a plurality of virtual software installed on the plurality of servers, and amending the primary topology report based on the one or more secondary analysis to create a secondary amended topology report;

executing a third script on the computer to compare the results in the secondary amended topology report regarding servers, processors and cores against publicly available CPU core relationship information regarding at least one of the CPUs, and amending the secondary amended topology report based on the publicly available CPU core relationship information to create an updated secondary amended topology report; and executing a fourth script on the computer to generate an exception report based on information in the updated secondary amended topology report, wherein payment of royalties for the operating systems is made based at least partially on the updated secondary amended topology report.

14. The method of claim 13, wherein the scripts used to run the primary analysis and the one or more of the secondary analyses are modified based on the exception report.

15. The method of claim 13, wherein the primary analysis and the one or more secondary analyses are re-run periodically.

16. The method of claim 15, wherein the primary analysis and the one or more secondary analyses have different periods of time for re-running.

17. The method of claim 13, wherein the primary analysis attempts to locate each of the operating systems as residing on at least one of either one of the virtual servers or one of the physical servers or both.

18. The method of claim 17, wherein the one or more secondary analyses attempts to locate each of the operating systems as residing on at least one of either one of the virtual servers or one of the physical servers or both.

19. The method of claim 13, wherein the exception report identifies servers that need further study.

* * * * *